United States Patent [19]

Behr et al.

[11] 4,149,198
[45] Apr. 10, 1979

[54] TRANSDUCER POSITIONING SYSTEM

[75] Inventors: Michael I. Behr, South Pasadena; Norman S. Blessum, Thousand Oaks; Wilfred D. Iwan, Sierra Madre, all of Calif.

[73] Assignee: Burroughs Corporation, Detroit, Mich.

[21] Appl. No.: 609,825

[22] Filed: Sep. 2, 1975

Related U.S. Application Data

[63] Continuation-in-part of Ser. No. 574,872, May 6, 1975, Pat. No. 4,007,493.

[51] Int. Cl.² ............................................. G11B 21/10
[52] U.S. Cl. .......................................... 360/77; 360/76
[58] Field of Search ...................... 360/77, 76, 78, 106, 360/135, 75, 27

[56] References Cited

U.S. PATENT DOCUMENTS

| 2,938,962 | 5/1960 | Konins et al. | 360/76 |
|---|---|---|---|
| 3,034,111 | 5/1962 | Hoagland et al. | 360/77 |
| 3,175,205 | 3/1965 | Auyang | 360/77 |
| 3,185,972 | 5/1965 | Sippel | 360/76 |
| 3,479,664 | 11/1969 | Stuart-Williams et al. | 360/77 |
| 3,665,118 | 5/1972 | Cooper, Jr. | 360/21 |
| 3,686,649 | 8/1972 | Behr | 360/77 |
| 3,964,094 | 6/1976 | Hart | 360/76 |

Primary Examiner—Alfred H. Eddleman
Attorney, Agent, or Firm—Nathan Cass; Kevin R. Peterson; Edward J. Feeney, Jr.

[57] ABSTRACT

Method and apparatus for providing coarse and fine radial positioning of a multiple head assembly relative to the concentric tracks of a rotatable magnetic disk. In addition to a plurality of data heads, the head assembly also includes a pair of position sensing heads having skewed core gaps disposed at an angle with respect to each other. These position sensing heads are used for prerecording concentric position control tracks on the disk as well as for subsequent sensing of position control information during both coarse and fine positioning operations. The position control information prerecorded in the position control tracks is specially chosen so as to provide a pair of pulse trains during position sensing having characteristics such that highly accurate and reliable control of head position can be achieved based upon a detection of the coincidence relationship between predetermined pulses of the respective pulse trains.

20 Claims, 9 Drawing Figures

TRANSDUCER POSITIONING SYSTEM

This patent application is a continuation-in-part of U.S. patent application Ser. No. 574,872, filed May 6, 1975, now U.S. Pat. No. 4,007,493.

CROSS-REFERENCE TO RELATED PATENT

The commonly assigned U.S. Pat. No. 3,686,649, issued Aug. 22, 1972 to Michael I. Behr discloses a related method and apparatus for positioning a magnetic transducer relative to a rotating recording disk.

BACKGROUND OF THE INVENTION

This invention relates to improved means and methods for accurately positioning a multiple transducer assembly relative to a plurality of tracks on a moving recording medium.

A typical device to which the present invention may be applied is a magnetic disk recording and reproducing system employing a multiple magnetic head assembly which is radially positionable to a selected one of a plurality of positions relative to a plurality of concentric tracks provided on the disk. The radial positioning of the head assembly typically involves two steps: (1) a coarse positioning step (also commonly referred to as track seeking) for coarsely positioning the head assembly relative to a selected position, and (2) a fine positioning step (also commonly referred to as track following) for bringing the head assembly into accurate alignment with the selected position and for maintaining this alignment until it is desired that the head assembly be repositioned.

SUMMARY OF THE INVENTION

Briefly the present invention is directed to improved means and methods for providing the above described coarse and fine positioning operations in a recording and reproducing system in a highly accurate and reliable manner using position sensing transducers in the head assembly which cooperate with specially chosen control tracks provided on the recording medium.

In a typical embodiment of a magnetic disk recording and reproducing system in accordance with the invention, the position sensing magnetic heads are located at opposite ends of an adjustably positionable magnetic head assembly with the data heads being located therebetween. Each position sensing head is provided with a skewed core gap forming an angle with respect to the other. These position sensing heads are used both for prerecording and subsequent sensing of position control information along respective position control tracks provided on the disk. The position control information prerecorded in each control track is specially chosen so as to permit obtaining a highly accurate and reliable determination of head position based upon a detection of the coincidence relationship between predetermined pulses of the respective pulse trains derived from the control tracks.

The foregoing and other objects, features, uses and advantages of the invention will be apparent from the following description of preferred embodiments of the invention, as illustrated in the accompanying drawings.

BRIEF DESCRIPTION OF THE DRAWINGS

In the drawings.

Like numerals and characters refer to like elements throughout the figures of the drawings.

Figure 1:
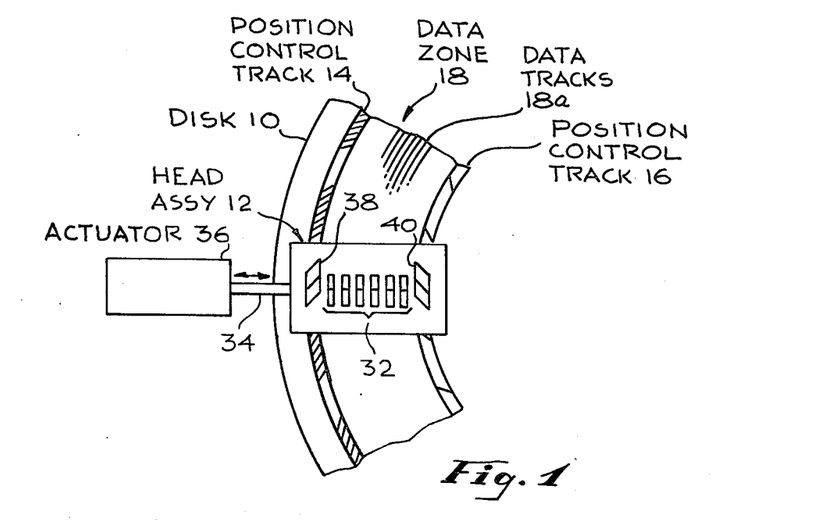
FIG. 1 is a fragmentary view of a magnetic disk recording and reproducing system including a multiple head assembly in accordance with the present invention.

Attention is initially directed to FIG. 1 wherein there is shown a fragmentary portion of a rotatable magnetic storage disk 10 for use with a selectively positionable multiple head assembly 12 according to the invention. At least one surface of the disk 10 is provided with a magnetizable coating. Data and positioning information may be stored or reproduced from the disk 10 by data heads 32 and position sensing heads 38 and 40 provided in the head assembly 12. Although the invention will be described as being incorporated in a single-disk magnetic storage system, is should be appreciated by those skilled in the art that the inventive features may be used with equally beneficial results in other data storage devices including, for example, disk pack or file systems, magnetic tapes, drums and strip files.

Figure 2:
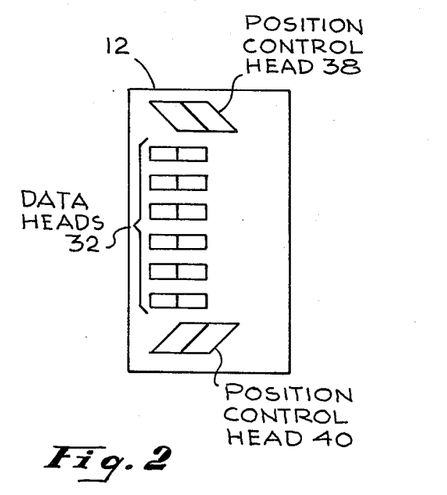
FIG. 2 is a schematic view of one embodiment of a multiple head assembly in accordance with the invention.
Figure 3:
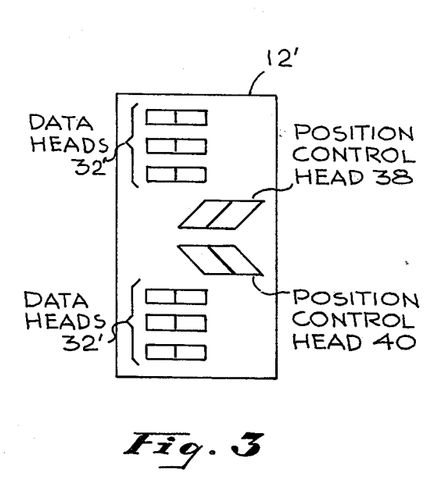
FIGS. 3 and 4 are views similar to FIG. 2 illustrating alternative embodiments of a multiple head assembly in accordance with the invention.

As is conventional, digital information in the form of magnetic signals is recorded on the disk along a plurality of concentric tracks. In the embodiment of the invention illustrated in FIG. 1, data tracks are recorded in a data zone 18 which is located between a pair of corresponding position control tracks 14 and 16. Although only data zone 18 and a pair of corresponding control tracks 14 and 16 are shown in FIG. 1, it will be understood that many more are ordinarily provided on an actual disk with a separate multi-transducer head 12 being provided for each data zone. Typically, each control track 14 or 16 may be 50 mils wide and each data track may be 1.3 mil wide with a spacing of 1.8 mil being provided between adjacent data tracks. As illustrated in FIGS. 1-3, a head assembly may, for example, be provided with six data heads 32, and the head assembly 12 may, for example, be selectably positionable by actuator 36 to any selected one of thirty-two possible positions. In such a case, each data head 32 would be selectably positionable to any selected one of thirty-two corresponding data tracks, resulting in a total of 192 data tracks in a typical data zone 18.

Referring now to FIG. 2, a first embodiment of the head assembly 12 of the type illustrated in FIG. 1 is seen to typically comprise oppositely skewed magnetic position sensing heads 38 and 40, and six magnetic read/write data heads 32, the data heads 32 being disposed intermediate the position sensing heads 38 and 40. The position sensing heads 38 and 40 are preferably circumferentially displaced from the data heads by an appropriate distance, such as shown in FIG. 2, in order to reduce crosstalk when the data heads are being used for recording.

Figure 4:
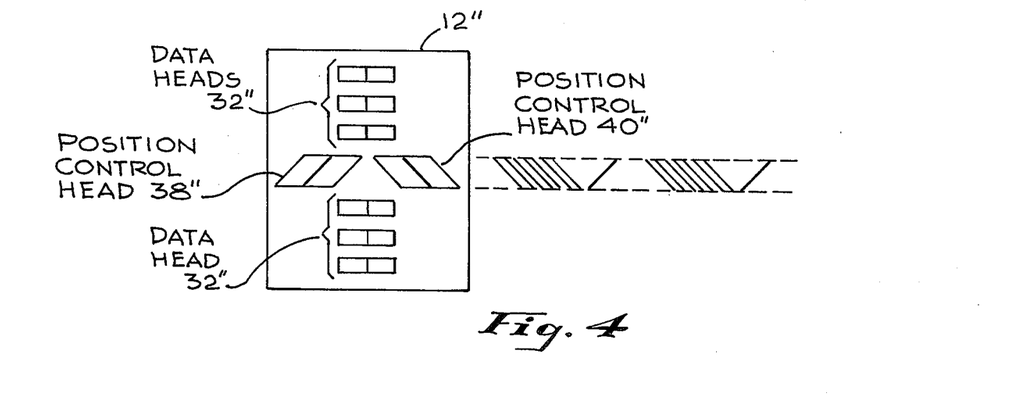

Alternative multiple head arrangements in accordance with the invention are shown in FIGS. 3 and 4. In the head assembly 12' illustrated in FIG. 3 the position sensing heads 38' and 40' of the head assembly 12' are disposed in the center, intermediate the data heads 32'. In the head assembly 12", illustrated in FIG. 4, the position sensing heads 38" and 40" are also located intermediate the data heads 32" but in line with one another, rather than adjacent to one another as in FIG. 3. Thus, a single control track containing transitions from both of the position control heads 38" and 40" is produced by the multiple head assembly 12" of FIG. 4 which, as will become evident hereinafter, can also be advantageously employed in accordance with the principles of the present invention. It will also be understood that the two position sensing heads 38" and 40" may, if desired, be provided in a single composite head assembly design.

As shown in FIG. 1, the head assembly 12 is disposed over data zone 18 of the disk 10 and is mounted on a linkage 34 to provide for selectable radial movement of the head assembly 12 under the control of the controllable actuator 36 to which the linkage 34 is mechanically coupled. In operation, the disk 10 is rotated at high speed during which a thin air layer is created which follows the disk surface, the magnetic head assembly 12 being designed in a conventional manner to "fly" on this air layer in close proximity to the disk surface.

The specific manner in which the present invention provides for obtaining highly accurate and reliable positioning of the head assembly 12 in FIG. 1 relative to its data zone 18 will now be considered in more detail with reference to the illustrative embodiments shown in FIGS. 5–9. For simplicity and easier understanding, it will be assumed that the head assembly 12 is adjustably positionable to any of seven equally spaced radial positions relative to its data zone 18, so as to thereby permit each data head 32 to be selectively positionable to any one of seven corresponding data tracks. As mentioned previously, a more typical number of possible positions for the head assembly 12 relative to its data zone 18 is thirty-two, but the description of positioning among seven possible positions will suffice to clearly demonstrate how the present invention may be applied to provide for accurate and reliable positioning of the head assembly among any desired number of positions.

Figure 5:
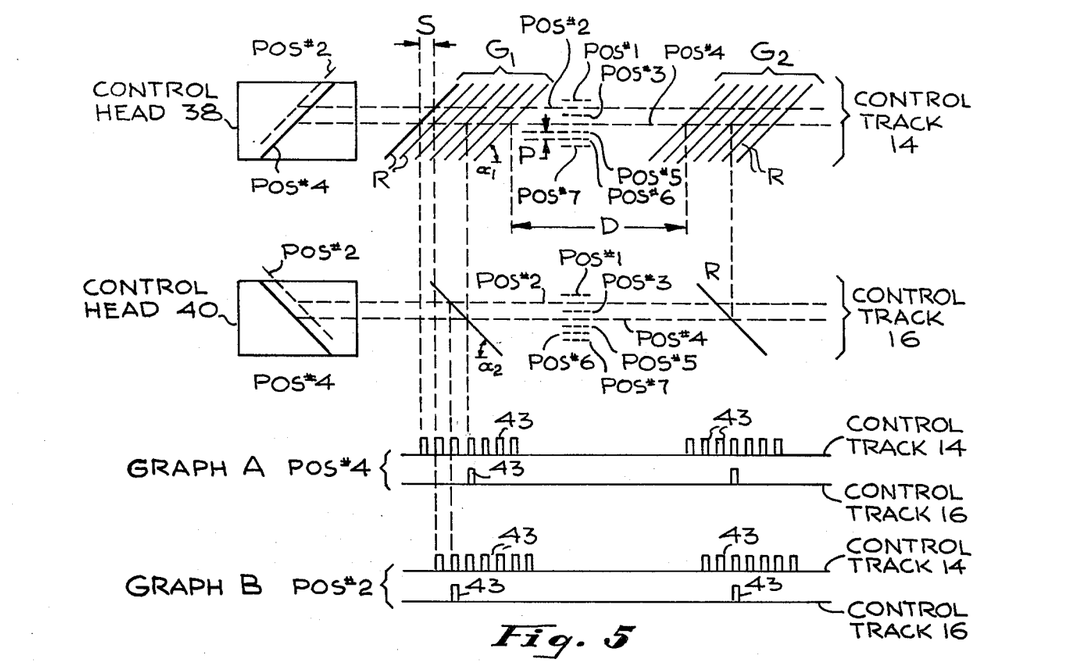
FIG. 5 is a schematic illustration showing a first pattern of magnetic transitions which may be provided along the positioning control tracks in accordance with the invention along with typical pulse trains derived therefrom.

FIG. 5 illustrates a first way in which skewed magnetic transitions may be prerecorded in control tracks 14 and 16 by position sensing heads 38 and 48, respectively, in accordance with the invention. As is well known, a magnetic transition is the boundary between two adjacent regions of different magnetic polarity, and constitutes one way of providing a detectable manifestation for the purposes of the present invention. As shown, control track 14 is recorded so that a plurality of spaced groups $G_1$, $G_2$, etc. of skewed parallel transitions R are repeatedly provided around the disk, the transitions R in each group being spaced by a distance S, and the groups being spaced from one another by a distance D. Control track 16 is recorded with only one oppositely skewed transition R for each of the transition groups of control track 14. The transitions R in the control tracks 14 and 16 are oppositely skewed from each other with each transition R preferably being provided at an angle of 45° relative to the circumferential direction.

Figure 7:
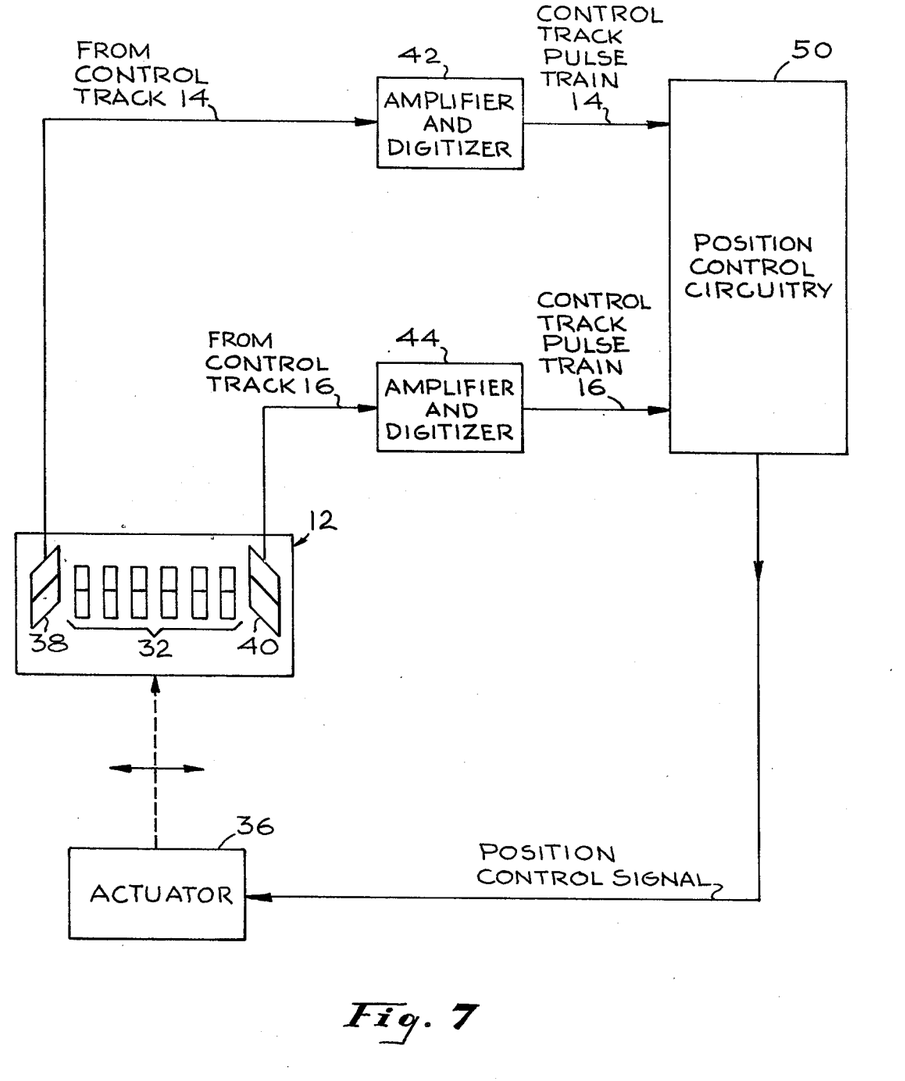
FIG. 7 is a schematic diagram broadly illustrating how a pair of pulse trains produced by the specially chosen control track transition patterns, such as illustrated in FIGS. 5 and 6, are employed for providing positioning control of a head assembly in accordance with the invention.

Referring momentarily to the schematic diagram of FIG. 7, it is to be understood that, during system operation, position sensing heads 38 and 40 of head assembly 12 sense the transitions R in their respective control tracks 14 and 16, the resulting sensed signals being fed to respective amplifier and digitizers 42 and 44 which operate in a conventional manner to produce a single output pulse 43 for each transition R intercepted by a position sensing head 48 or 50. Pulse trains are thus obtained at the outputs of the amplifier and digitizers 42 and 44 as illustrated, for example, by Graphs A and B in FIG. 5. Graph A illustrates the pulse trains obtained from control tracks 14 and 16 for position #4 of the head assembly, while Graph B illustrates the pulse trains obtained for position #2 of the head assembly. As pointed out previously, it is being assumed that the head assembly is positionable to seven equally spaced radial positions relative to its data zone, as indicated by the dashed lines designated positions #1, #2, #3, #4, #5, #6 and #7 in FIG. 5. Each of these dashed lines represents the respective path traversed by the center of a position sensing head when in that position, the position-to-position spacing being indicated by the distance P.

It will be evident from FIG. 5 that, because of the oppositely skewed relationship of the transitions R in control tracks 14 and 16, the time of interception of a transition R by a position sensing head 38 or 40 will vary depending on radial head position. Assuming disk movement from right to left in FIG. 4, the time of interception of a transition R in control track 14 will occur later as the head assembly moves in an up direction (towards a lower numbered position), and will occur earlier as the head assembly moves in a down direction (towards a higher numbered position). On the other hand, the opposite situation will occur in control track 16, the time of interception of a transition R occuring earlier as the head assembly moves in an up direction, and occuring later as the head assembly moves in a down direction. As will be evident from Graphs A and B in FIG. 5, a determination of head assembly position can thus be derived by detecting the time relationship of each pulse of control track 14 relative to its corresponding group of pulses of control track 16.

As pointed out previously herein, in order to achieve high positioning accuracy and reliability, specially chosen transition arrangements are provided in control tracks 14 and 16 such that head assembly position can be determined based on a detection of a coincidence relationship between predetermined pulses of the pulse trains derived from control tracks 14 and 16. In general, this is accomplished for a transition arrangement such as illustrated in FIG. 5, by choosing the transition spacing S and the skew angles $\alpha_1$ and $\alpha_2$ in conjunction with the position-to-position spacing P so that, for each of the selectable positions of the head assembly, each pulse derived from pulse train 16 will be coincident with a different one of the pulses of its corresponding group of pulses derived from control track 14. More specifically, in order to achieve this coincident relationship in the transition arrangement illustrated in FIG. 5, the transition spacing S and the skew angles $\alpha_1$ and $\alpha_2$ are chosen in conjunction with the position-to-position spacing P so that radial movement of the head assembly by an amount equal to the position-to-position spacing P will cause a relative change in phase between the derived pulse trains equal to the spacing T between pulses. It will be understood from FIG. 5 that this relationship will be achieved if the following mathematical equation is satisfied:

$$S = P \{(1/\tan \alpha_1) + (1/\tan \alpha_2)\}$$

In particular, if $\alpha_1 = \alpha_2 = 45°$, as is the case in FIG. 5, the equation reduces to:

$$S = 2P$$

As another example, if $\alpha_1 = 45°$ and $\alpha_2 = 90°$, which is another possibility of the transition arrangement of FIG. 5, then the above equation reduces to:

$$S = P$$

It will thus be understood that the desired coincident relationship is achieved for the seven possible positions of the head assembly using the transition arrangement of FIG. 5 by: (1) providing at least seven transitions R, each skewed at 45°, in each group of control track 14, one transition for each of the seven head assembly positions; (2) choosing the transition spacing S to be twice the position spacing P, that is, S = 2P; and (3) recording each transition R in control track 16 simultaneously with the fourth transition of the corresponding group in control track 14 and oppositely skewed relative thereto. If each transition of control track 16 were to be recorded in a different position relative to its corresponding group in control track 14, then a compensating delay could be provided for appropriately delaying one pulse train relative to the other so that the pulse coincidences occur in correspondence with the head assembly positions.

It will be evident from the foregoing and the exemplary Graphs A and B in FIG. 5 which show the pulse trains obtained for head assembly positions #4 and #2, respectively, that the transition arrangement of FIG. 5 provides resulting pulse trains such that the pulse from control track 16 will be coincident with the first pulse of control track 14 when the head assembly is in position #1, with the second pulse of control track 14 when in position #2, with the third pulse of control track 14 when in position #3, with the fourth pulse of control track 14 when in position #4, with the fifth pulse of control track 14 when in position #5, with the sixth pulse of control track 14 when in position #6, and with the seventh pulse of control track 14 when in position #7. Thus, the arrival of the head assembly at a desired position can be accurately and reliably determined based upon a detection of the occurrence of pulse coincidence between the particular corresponding pulses derived from control tracks 14 and 16.

Figure 6:
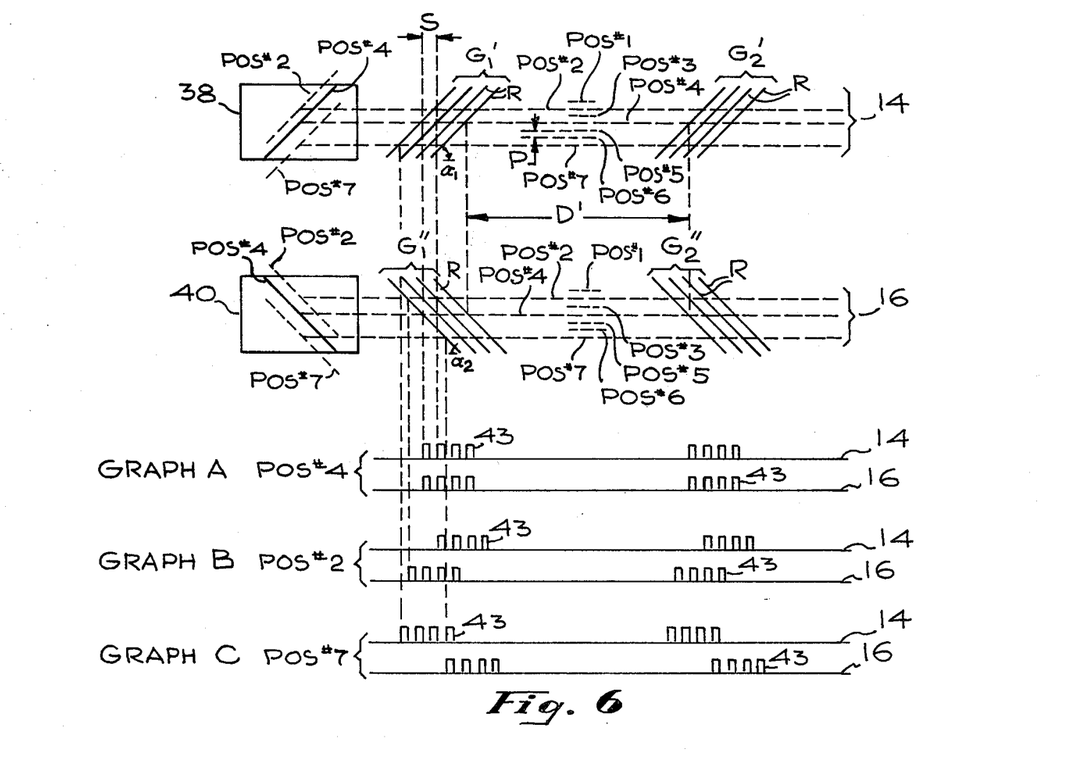
FIG. 6 illustrates a second pattern of magnetic transitions which may be provided along the positioning control tracks in accordance with the invention along with typical pulse trains derived therefrom.

FIG. 6 shows another possible arrangement in accordance with the invention for recording the transitions R in control tracks 14 and 16 so as to provide for the determination of head assembly position based upon a detection of the coincidence relationship between particular pulses of the respective pulse trains derived from the control tracks 14 and 16. As shown in FIG. 6, the control tracks 14 and 16 are provided with oppositely skewed repeating groups of parallel transitions $G_1'$, $G_2'$, etc. and $G_1''$, $G_2''$, etc. separated by a distance D', and with corresponding transitions in each control track being aligned as a result of being recorded simultaneously with one another. Thus, the first, second, third and fourth transitions in each group of control track 14 are respectively aligned with the first, second, third and fourth oppositely skewed transitions of the corresponding group of transitions in control track 16. As in the arrangement of FIG. 5, the transition spacing S is chosen equal to twice the position spacing P, and the transitions are skewed at an angle of 45° from the circumferential direction. As will be evident from Graphs A, B and C in FIG. 6, corresponding to head assembly positions #4, #2, and #7, respectively, the arrangement of the transitions in control tracks 14 and 16 illustrated in FIG. 6 results in producing a pair of pulse trains having the four pulses of each pair of corresponding groups in a different coincident relationship for each of the seven possible positions of the head assembly. More specifically, it will be evident that, when the head assembly is in position #4 (Graph A), the first pulses of the pulse trains will be in coincidence with neither pulse train leading or lagging the other. For the lower numbered positions #3, #2 and #1 of the head assembly, the pulse train of control track 16 will lead the pulse train of control track 14 with the first pulse of each group of the pulse train of control track 14 being in coincidence with the second, third, and fourth pulses, respectively, of each corresponding group of the pulse train of control track 16. For the higher numbered positions #5, #6 and #7 of the head assembly, the pulse train of control track 14 will lead the pulse train of control track 16 with the first pulse of the pulse train of control track 16 being in coincidence with the second, third, and fourth pulses, respectively, of each corresponding group of the pulse train of control track 14. It will be apparent that the FIG. 6 arrangement of transitions can be provided more compactly on a disk than the arrangement of FIG. 5, since it permits obtaining a unique pulse concidence relationship for each head assembly position using only four transitions in each group.

Reference is now directed to FIG. 7 which broadly indicates how the pair of pulse trains produced by the control track transition arrangements of either FIG. 4 or FIG. 5 may be employed for providing positioning control of the head assembly 10 in the system of FIG. 1. As shown, the pulse trains from control tracks 14 and 16 provided at the outputs of amplifier and digitizers 42 and 44, respectively, are applied to position control circuitry 50 which, in response thereto, generates a positioning control signal which is applied to the actuator 36 for providing the desired positioning control of the head assembly 10.

It will be understood that the transition arrangements illustrated in FIGS. 5 and 6 for control tracks 14 and 16 may be provided using either of the head assemblies 12 or 12' in FIGS. 2 and 3. It will also be understood that the head assembly 12' illustrated in FIG. 4 having in-line position sensing heads 38" and 40" may also be employed to provide equivalent transition arrangements to those illustrated in FIGS. 5 and 6 by recording the oppositely skewed transitions of control tracks 14 and 16 in a single control track. The opposite skewing of the transitions in such a single control track permit substantially independent recording or reproducing of each transition by its respective position sensing heads 38" or 40" so as to thereby permit deriving separate pulse trains therefrom similar to those illustrated in FIGS. 5 and 6. It will be understood that the same phase relationship as illustrated for the pulse trains in FIGS. 5 and 6 may also be provided for the pulse trains derived from a single control track using the in-line position sensing heads 38" and 40" in FIG. 4 by appropriately choosing the particular relative locations at which the transitions are recorded in the single control track so as to compensate for the spacing between the position control heads 38" and 40" and/or by appropriately delaying one pulse train relative to the other before application to the position control circuitry 50 in FIG. 7.

Figure 8:
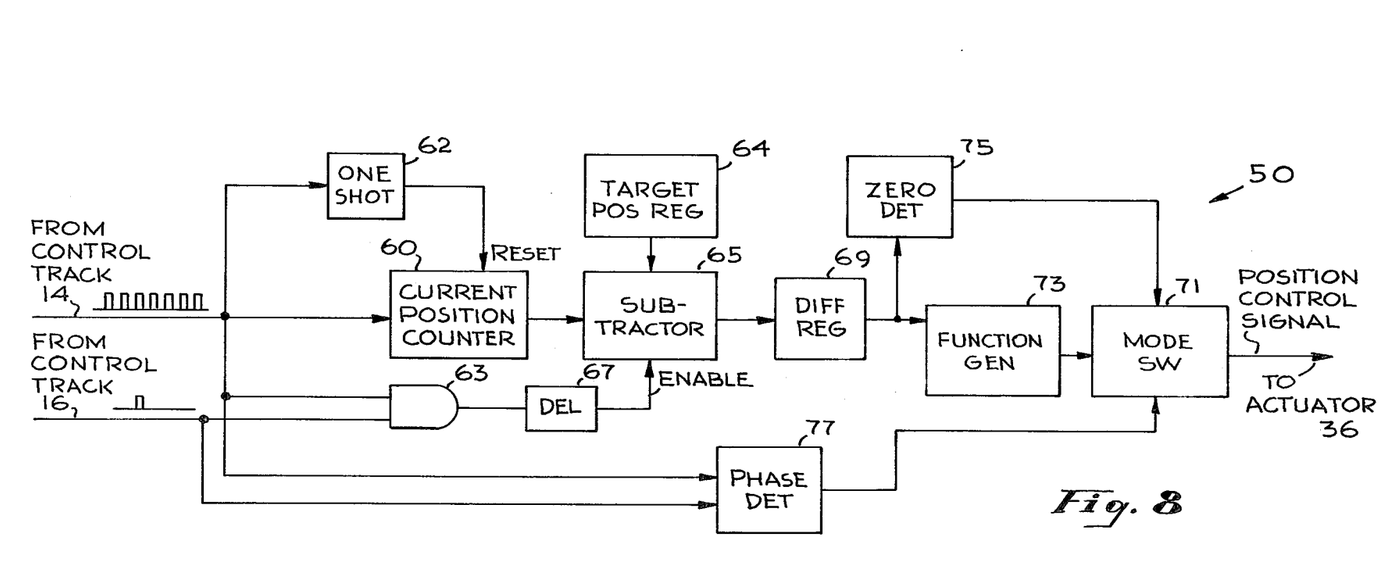
FIG. 8 is an electrical block diagram illustrating how the position control circuitry 50 of FIG. 7 may be implemented for the control pattern of FIG. 5.

Referring next to FIG. 8, illustrated therein is an implementation of the position control circuitry 50 in FIG. 7 which may be employed using pulse trains derived from control track transition patterns such as illustrated in FIG. 5 in which control track 14 is provided with spaced groups of skewed transitions, while control track 16 is provided with a single oppositely skewed transition for each group of control track 14. As illustrated in FIG. 8, the groups of pulses from control track 14 are applied to a current position counter 60 which, in a conventional manner, operates in response to the applied pulses to provide counts respectively representing the seven possible positions #1, #2, #3, #4, #5, #6 and #7 of the head assembly. The pulses from control track 14 are also applied to a one-shot 62 which is designed in a conventional manner to be turned "on" by the first pulse of each group, to remain "on" until a time after receipt of the last pulse of the group, and to then turn "off" (during the period D in FIG. 4) before the arrival of the first pulse of the next group. The turning "off" of the one-shot 62 is employed to reset the current position counter 60 to an initial count, so as to thereby assure that its counts will correctly correspond to the head assembly positions during receipt of the pulses of each group. It will be understood that this provision for resetting of the counter 60 prior to the receipt of each group of pulses permits additional transitions, besides those required for position detection, to be provided in one or more groups, such as might be desirable for synchronizing or other timing control purposes.

Considering the operations occurring during coarse positioning of the head assembly, it will be understood from FIG. 8 that the desired new position number is set up in a target register 64 whose output is applied to a subtractor 65 along with the output of the current position counter 60. In addition to the pulses from control track 14 being applied to the counter 60, they are also applied to an AND gate 63 along with the pulses from control track 16 for determining the coincidence thereof. The output of AND gate 63 is in turn applied to the enable input of the subtractor 65, via a relatively small delay 67, for the purpose of initiating a subtracting operation each time that a pulse of control track 16 is detected by AND gate 63 to be in coincidence with a pulse of control track 14. The small delay 67 is provided to afford sufficient time during a coincidence condition between the pulses from control tracks 14 and 16 for the current position counter 60 to advance to its next count before initiation of the subtraction operation, thereby assuring that the counter 60 has a count representative of the corresponding head assembly position when subtraction occurs. For example, it will be noted from Graph B in FIG. 4 corresponding to position #2, that coincidence occurs with respect to the second pulse of control track 14. Thus, the counter 60 should respond to both of the first and second pulses of the group in order to advance from its zero reset condition to a count of two representative of position #2. The delay 67 assures that the counter 60 will have advanced to this second count in response to the second pulse of the group before initiation of the subtraction operation in response to AND gate 63 having detected the coincidence of this second pulse of the group with the pulse in control track 16.

Accordingly, operation in FIG. 8 during coarse positioning is such that, in response to each coincidence of a pulse of control track 16 with a pulse of a group of control track 14, the subtractor 65 is enabled to provide an output to a difference register 69 representing the difference between the target position and the current position of the head assembly. The output of the subtractor 65 also includes a polarity signal which is used to indicate the direction of desired head movement, this polarity signal also being set up in the difference register 69. The output of the difference register 69 including the polarity indication is applied to a function generator 73 whose output is in turn applied to a mode switch 71 for providing the position control signal required during coarse positioning. The mode switch 71 remains in a coarse positioning mode so long as the output of the difference register 69 is not zero, as detected by a zero detector 75. It will be understood that the function generator 73 may be designed in a conventional manner to respond to the decreasing output of the difference register 69 occurring during coarse positioning so as to provide a position control signal via the mode switch 71 for the actuator 36 (FIG. 6) having an appropriate velocity characteristic for moving the head assembly towards the target position in a manner so that the head assembly will not overshoot the target position.

When the actuator 36 (FIGS. 1 and 6) has moved the head assembly 10 to a position such that the pulse of control track 16 becomes coincident with the particular pulse of the group of control track 14 corresponding to the target position, the outputs of the current position counter 60 and the target position register 64 will be the same. Thus, when the subtractor 65 is initiated, a zero result is obtained which is set up in the difference register 69, thereby causing the zero detector 75 to switch the mode switch 71 to the fine positioning mode. It will be understood that because of the availability of high speed integrated circuit chips for performing the coincidence detection and other operations described above, the target position can be determined with unusually high precision.

In the fine positioning mode, a phase detector 77 to which the pulse trains 14 and 16 are also applied serves to provide an output signal via mode switch 71, which is representative of the magnitude and polarity of the phase difference (that is, the direction and extent of lack of coincidence) between each pulse of control track 16 and the particular pulse of each group of pulses of control track 14 corresponding to the target position. It will be understood that the phase detector 77 may be designed in a conventional manner to provide an appropriate position control signal to the actuator 36 (FIG. 7) for maintaining the head assembly in precise alignment with the target position.

Figure 9:
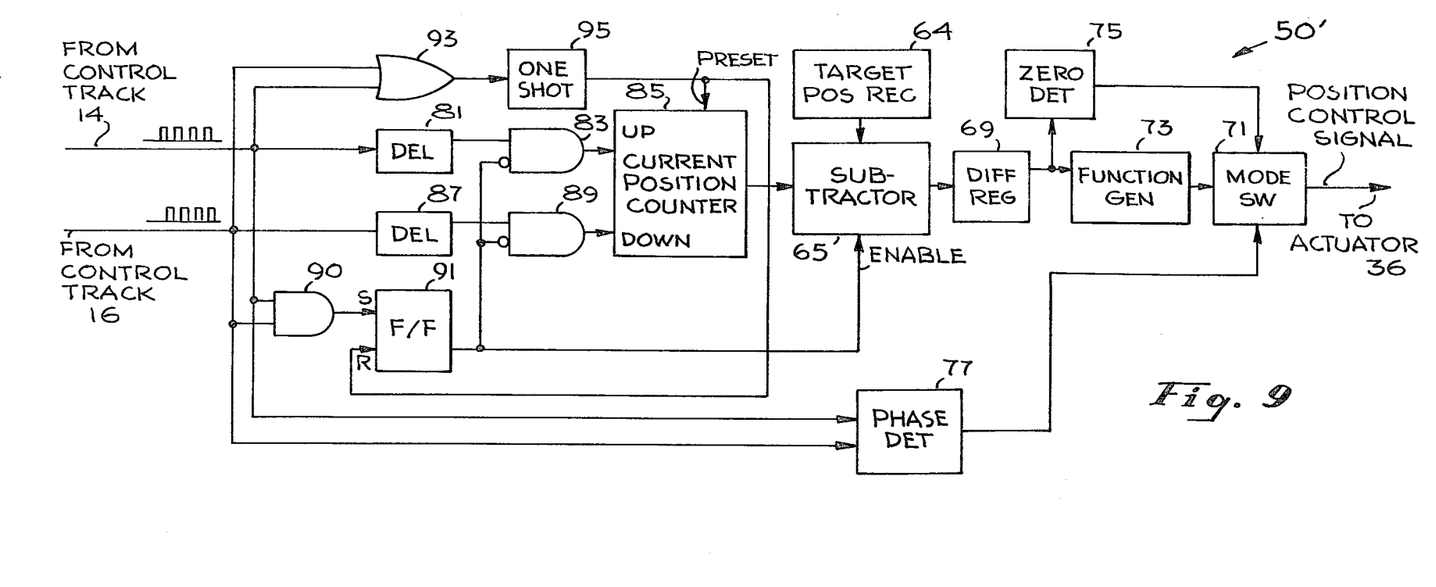
FIG. 9 is an electrical block diagram illustrating how the position control circuitry 50 of FIG. 7 may be implemented for the control pattern of FIG. 6.

Referring next to FIG. 9, illustrated therein is another implementation of the position control circuitry 50' in FIG. 7 which may be employed using pulse trains derived from control track transition arrangements, such as illustrated in FIG. 6, in which both of the control tracks 14 and 16 are provided with spaced groups of parallel transitions, the transitions in one control track being oppositely skewed and aligned with respect to those in the other control track. The basic differences between the implementation of FIG. 9 from that of FIG. 8 are contained in the portion of FIG. 9 ahead of the subtractor 65. These differences result from the different operations required to be provided in order to employ the pulse trains derived from the control track patterns of FIG. 6 to control an Up/Down current position counter 85 so that it provides an appropriate count during subtraction which properly corresponds to the current position of the head assembly.

As illustrated in FIG. 9, the pulses from control track 14 are applied to the Up input of the current position counter 85 via a relatively small delay 81 and an AND gate 83, while the pulses from control track 16 are applied to the Down input of the current position counter 85 via a relatively small delay 87 and an AND gate 89. The pulses from control tracks 14 and 16 are also applied, via an AND gate 90, to a flip-flop 91 for setting the flip-flop when the AND gate 90 detects the first coincidence occurring between a pulse of control track 14 and a pulse of control track 16. The pulses from control tracks 14 and 16 are additionally applied via an OR gate 93 to a one-shot 95 which, in a generally similar manner to that of the one-shot 62 in FIG. 8, operates in response to the first occurring pulse of either group of a corresponding pair of groups from control tracks 14 and 16 to remain "on" until after receipt of the last occurring pulse of the two groups, and to turn "off" before arrival of either of the first pulses of the next occurring pair of groups. The turning "off" of the one-shot 95 is employed to reset flip-flop 91, and also to preset the current position counter 85 to its middle position value, which for the seven possible positions being assumed in this description, is count #4.

It will be noted in FIG. 9 that the output of flip-flop 91 is also applied to an inverse input of each of AND gates 83 and 89. This is done for the purpose of preventing the first occurring coincidence pulses, as well as further coincident pulses of the same pair of corresponding groups, from reaching the inputs of counter 85. The delays 81 and 87 assure that the AND gates 83 and 87 are inhibited by the turning "on" of flip-flop 91 before the first occurring coincidence pulses arrive thereat. Thus, it will be understood that, during coarse positioning, the counter 85 will be incremented from its middle or #4 count in an up or down direction depending upon which group of pulses is leading. The number of counts by which the counter 85 is incremented or decremented is determined by the number of pulses occurring in the leading group before the pulse for which coincidence occurs. For example, in Graph B of FIG. 6 corresponding to head assembly position #2, it will be noted that the group of pulses from control track 16 are leading, and that two pulses of this leading group occur before the third pulse which is in coincidence with the first pulse of the group of pulses from control track 14. Accordingly, the Down input of the counter 85 will receive two pulses from the AND gate 89 before it is inhibited by the turning "on" of the flip-flop 91 in response to the detection by AND gate 90 of the coincidence of the third pulse of the group from control track 16 with the first pulse of the corresponding group from control track 14. The counter 85 will thus be decremented two counts from its #4 preset condition to thereby provide the correct #2 count corresponding to the current head assembly position #2. If, as another example, it is assumed that both pulse trains are aligned (that is, neither is leading or lagging), it will be understood that the first pulse of each group will be in coincidence, thereby causing flip-flop 91 to be turned "on" to prevent any pulse from either group from reaching the inputs of the counter 85. Thus, the counter will remain in its #4 count to correctly correspond to head assembly position #4.

Still with reference to FIG. 9, it will be seen that the output of the flip-flop 91, which it will be remembered is turned "on" in response to the first occurring coincidence between the groups of pulses from control tracks 14 and 16, is additionally applied to the enable input of the subtractor 65 so that the turning "on" thereof initiates a subtraction operation with respect to the outputs of the target position register 64 and the current position counter 85. The implementation and operation of the remaining portions of FIG. 9 for providing both coarse and fine positioning are the same as described for FIG. 7 and will thus not be repeated.

The above description has been concerned with the manner in which a single multiple head assembly may be precisely positioned among a plurality of selectable positions relative to a data zone. As pointed out previously, a conventional type of magnetic disk system to which the present invention may be applied typically employs a plurality of such multiple head assemblies, each located for operation and selective positioning with respect to a different one of a plurality of radially spaced data zones provided on the disk. It will be understood that the positioning of each such multiple head assembly relative to its data zone may be provided in the same manner as described herein. It will also be understood that, in order to more efficiently employ space on the disk, it is possible using head assemblies of the type illustrated in FIG. 2, to provide for each pair of adjacent multiple head assemblies to share a common control track. In such a case, the respective position sensing heads on the two multiple head assemblies are chosen to be oppositely skewed and located in overlapping fashion relative to the disk so as to permit each to record and reproduce position control information from the same control track. As described in connection with the in-line head assembly embodiment of FIG. 4, the oppositely skewed relationship of the position control heads of different head assemblies which share a common control track permit each to perform independently of one another so as to permit implementation of precise positioning control in the manner previously described herein.

It will be understood that the preferred embodiments described herein are only exemplary, and that the invention is capable of many modifications and variations in construction, arrangement and use without departing from the spirit of the invention. For example, although it has been assumed that the position-to-position spacing P in FIGS. 5 and 6 is constant, it will be appreciated that such is not necessary and that a variable spacing could be provided, in which case the spacing S between the skewed transitions would be varied accordingly.

Further modifications of the invention are also possible. For example, the means and methods disclosed herein are also applicable to tape systems and the like, as well as to disks or drums. Also, the present invention is applicable for providing the positioning required in other forms of recording and/or reproducing systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. In a system for positioning a transducer means among a plurality of selectable transverse positions with respect to a predetermined direction of relative movement between said transducer means and a recording medium, the improvement comprising:

position control information recorded on said medium in said direction of relative movement, said position control information comprising a first plurality of parallel transitions having an angle $\alpha_1$ relative to said direction of relative movement and at least one second transition having an angle $\alpha_2$ relative to a direction opposite to said direction of relative movement, the choice of $\alpha_1$ and $\alpha_2$ being limited in that neither $\alpha_1$ nor $\alpha_2$ can be 0°, and wherein only one of $\alpha_1$ and $\alpha_2$ can be 90°, said first plurality of transitions having a spacing S measured in said direction of relative movement which is chosen in conjunction with the spacing P between said selectable positions so as to satisfy the equation:

$$S = P\{(1/\tan \alpha_1) + (1/\tan \alpha_2)\};$$

first and second position control transducers coupled to said transducer means for transverse movement in accordance therewith, said first and second position control transducers being constructed and arranged for sensing said first and second transitions respectively;

digitizing means responsive to the sensing of said first and second transitions for producing respective first and second pulses corresponding thereto; and detecting means for indicating the transverse position of said transducer means relative to said medium based upon a detection of coincidence between predetermined ones of said first and second pulses produced by said digitizing means.

2. The invention in accordance with claim 1, including control means responsive to a transverse position indication produced by said coincidence responsive detecting means for controlling the transverse positioning of said transducer means.

3. The invention in accordance with claim 1, including control means responsive to a transverse position indication produced by said coincidence responsive detecting means for controlling the transverse positioning of said transducer means, and means operative in response to the detection of the arrival of said transducer means at a particular selectable position for maintaining said transducer means thereat based upon a detection of the extent of the coincidence relationship between the particular ones of said first and second pulses corresponding thereto.

4. The invention in accordance with claim 1, wherein said first plurality of transitions are successively provided on said medium in said direction of relative movement so as to form repeating groups of parallel first transitions, and wherein at least one second transition is provided for each group of first transitions.

5. The invention in accordance with claim 1, wherein $\alpha_1 = \alpha_2$.

6. The invention in accordance with claim 1, wherein $\alpha_1 = \alpha_2 = 45°$.

7. The invention in accordance with claim 1, wherein $\alpha_1 = 45°$ and $\alpha_2 = 90°$.

8. The invention in accordance with claim 4, wherein the number of said first transitions provided in each group is at least equal to the number of said selectable positions, and wherein only one corresponding second transition is provided for each group of first transitions.

9. The invention in accordance with claim 8, wherein $\alpha_1 = \alpha_2$.

10. The invention in accordance with claim 4, wherein said second transitions are successively provided on said medium in said direction of relative movement so as to likewise form repeating groups of parallel second transitions.

11. The invention in accordance with claim 10, wherein one group of second transitions having a like spacing S is provided for each group of first transitions, and wherein the number of transitions in each group is less than the number of said selectable positions.

12. The invention in accordance with claim 11, wherein $\alpha_1 = \alpha_2$.

13. The invention in accordance with claim 1, wherein said position control information is provided in first and second transversely spaced position control tracks on said recording medium, said first transitions being provided in said first control track and said second transitions being provided in said second control track.

14. The invention in accordance with claim 1, wherein said first and second transitions of said position control information are provided in a common control track of said recording medium.

15. The invention in accordance with claim 1, wherein each of said first and second position control transducers is constructed and arranged for both recording and sensing its respective transitions of said position control information.

16. The invention in accordance with claim 15, wherein said first and second position control transducers are located so that said position control information is provided in first and second transversely spaced position control tracks on said recording medium, said first transitions being provided in said first control track and said second transitions being provided in said second control track.

17. The invention in accordance with claim 14, wherein said first and second position control transducers are located with respect to sad common control track so as to provide for the respective sensing of said first and second transitions contained therein.

18. In a method for positioning a transducer means among a plurality of selectable transverse positions with respect to a predetermined direction of relative movement between said transducer means and a recording medium, the improvement comprising:

recording position control information on said medium in said direction of relative movement, said position control information comprising a first plurality of parallel transitions having an angle $\alpha_1$ relative to said direction of relative movement and at least one second transition having an angle $\alpha_2$ relative to a direction opposite to said direction of relative movement, the choice of $\alpha_1$ and $\alpha_2$ being limited in that neither $\alpha_1$ nor $\alpha_2$ can be 0°, and wherein only one of $\alpha_1$ and $\alpha_2$ can be 90°, said first plurality of transitions having a spacing S measured in said direction of relative movement which is chosen in conjunction with the spacing P between said selectable positions so as to satisfy the equation:

$$S = P\{(1/\tan \alpha_1) + (1/\tan \alpha_2)\};$$

individually sensing said first and second transitions;
digitizing the sensed first and second transitions to produce respective first and second pulses corresponding thereto;
detecting the coincidence relationship between predetermined ones of said first and second pulses; and
controlling the transverse position of said transducer means in response to the detected coincidence relationship between said first and second pulses.

19. The invention in accordance with claim 18, wherein said first plurality of transitions are successively provided on said medium in said direction of relative movement so as to form repeating groups of parallel transitions, and wherein at least one of said second transitions is provided for each group of said first transitions.

20. The invention in accordance with claim 19, wherein said second transitions are successively provided on said medium in said direction of relative movement so as to likewise form repeating groups of parallel transitions.

* * * * *

UNITED STATES PATENT AND TRADEMARK OFFICE
CERTIFICATE OF CORRECTION

PATENT NO. : 4,149,198
DATED : April 10, 1979
INVENTOR(S) : Michael I. Behr, et al.

It is certified that error appears in the above-identified patent and that said Letters Patent are hereby corrected as shown below:

Col. 2, line 42, change "is" to —it—.
Col. 4, line 46, change "occuring" to —occurring—;
line 48, change "occuring" to —occurring—.
Col. 5, line 20, change "of", first occurrence, to —for—.
Col. 12, line 54, change "sad" to —said—.

Signed and Sealed this

Twenty-sixth Day of June 1979

[SEAL]

Attest:

RUTH C. MASON
Attesting Officer

DONALD W. BANNER
Commissioner of Patents and Trademarks